May 21, 1968
G. E. BURBANK ET AL
3,384,733
ULTRASONIC INSPECTION SYSTEM AND APPARATUS FOR
RESISTANCE WELDS AND THE LIKE
Filed July 20, 1964
3 Sheets-Sheet 1
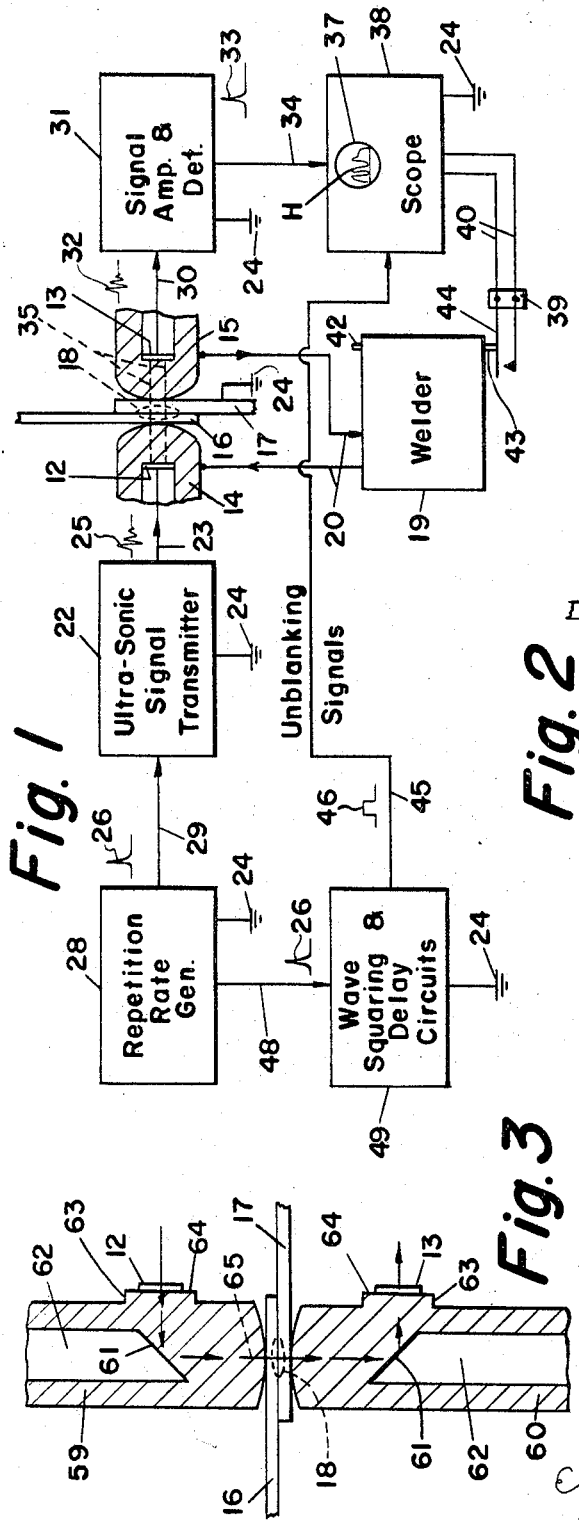
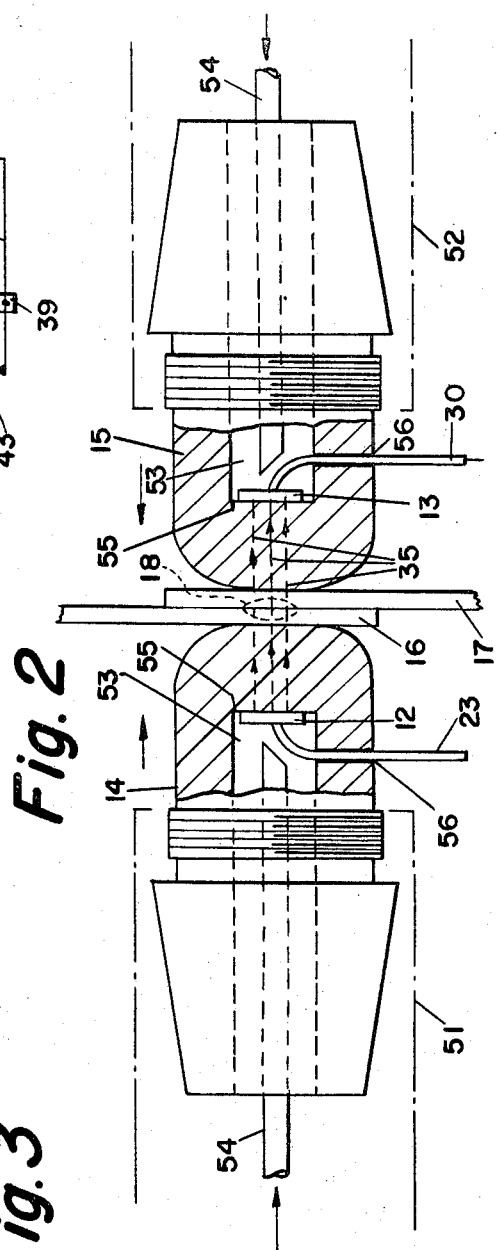
INVENTORS.
GEORGE E. BURBANK
WALLACE D. TAYLOR
ATTORNEYS

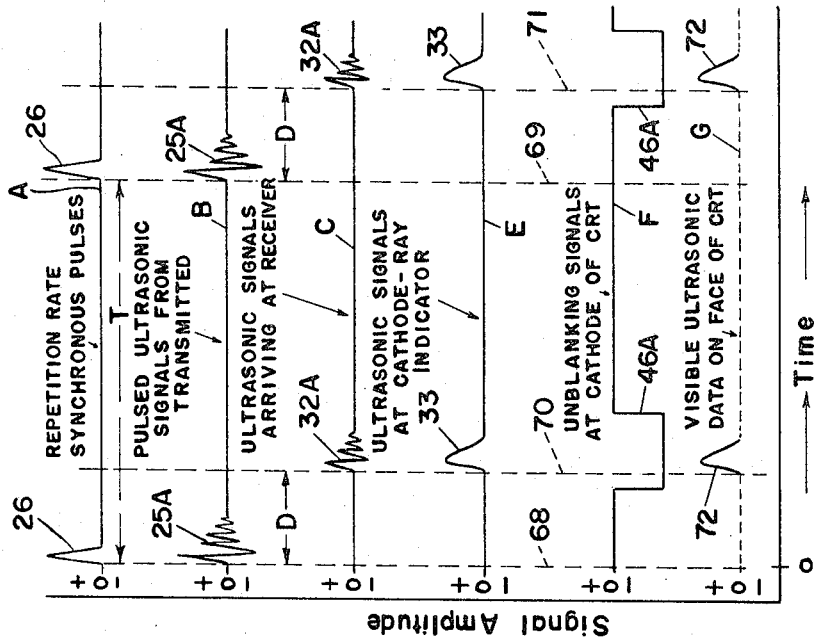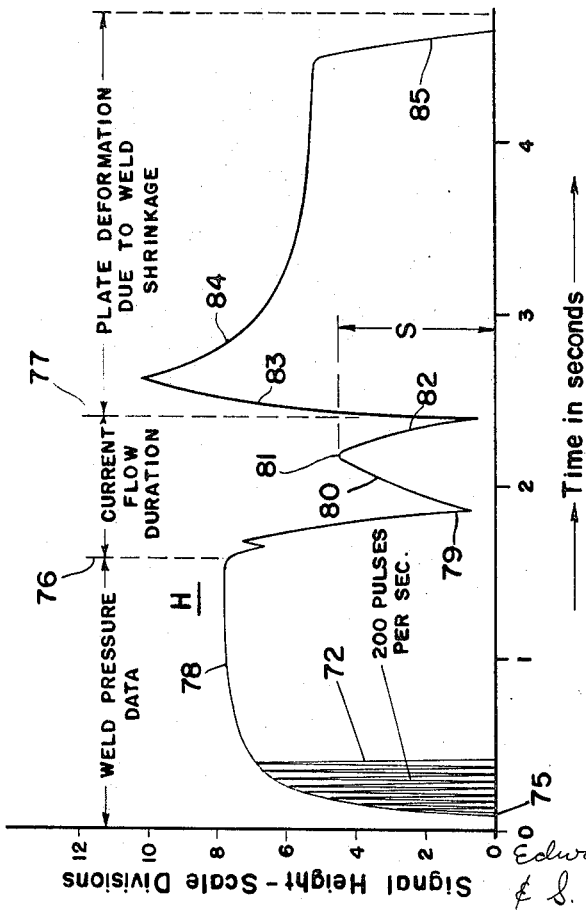

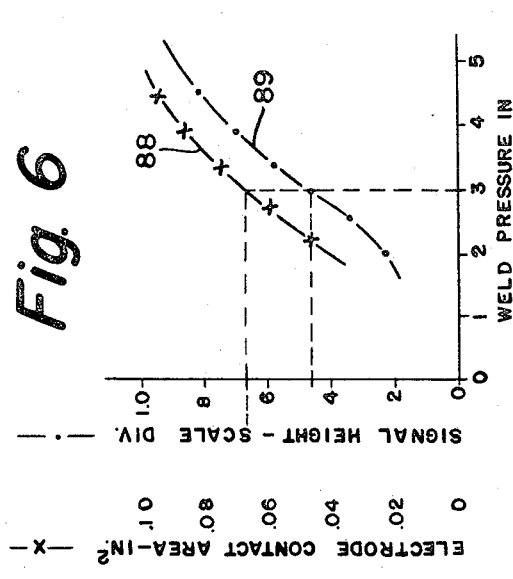
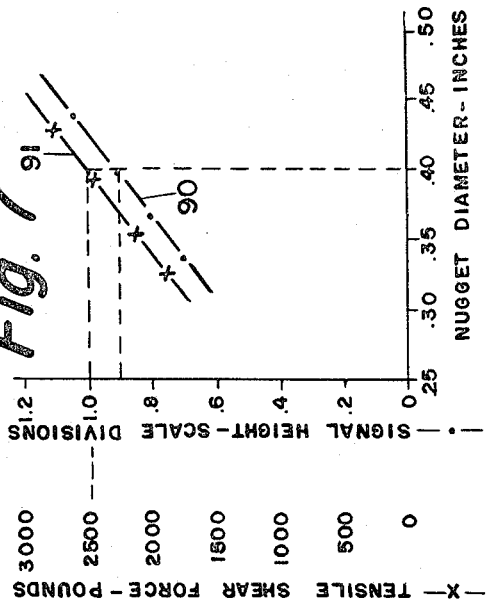
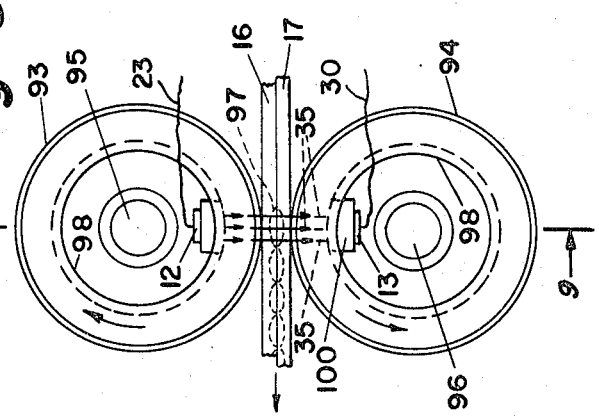
INVENTORS.
GEORGE E. BURBANK
WALLACE D. TAYLOR

United States Patent Office 3,384,733
Patented May 21, 1968

3,384,733
ULTRASONIC INSPECTION SYSTEM AND APPARATUS FOR RESISTANCE WELDS AND THE LIKE
George E. Burbank, Maple Shade, N.J., and Wallace D. Taylor, Wyncote, Pa., assignors to the United States of America as represented by the Secretary of the Army
Filed July 20, 1964, Ser. No. 384,004
6 Claims. (Cl. 219—109)

ABSTRACT OF THE DISCLOSURE

Nondestructive testing and inspection of welds by ultrasonic means. Spaced high frequency bursts of ultrasonic energy are transmitted from one electrode, through the weld zone, to the opposite electrode. A receiving transducer picks up the signal which is amplified and then detected to produce an envelope of the input signal. The detected signal pulses are then applied to the cathode ray tube of an oscilloscope where the amount of attenuation and shape of the overall traces provide an indication of the weld quality.

---

The invention described herein may be manufactured and used by or for the Government for governmental purposes without the payment to us of any royalty thereon.

The present invention relates to spot or resistance welding systems and apparatus for joining metallic plates and like bodies in contact under pressure by spot welds or weld nuggets, and providing in the welded joints a strength that is a function of the nugget or spot parameters. More particularly, the present invention relates to systems and apparatus for the nondestructive inspection and testing of such spot or resistance welds for quality assurance and safety in performance.

The problems of minimizing or substantially overcoming the possibility of producing defective or marginal quality welds of this type has led to considerable development work in this field, and several approaches to the problem have been explored. Techniques that have been evaluated include photographic or X-ray, infra-red, electrical resistance-measuring and mechanical ultrasonic methods and means for the nondestructive inspection and testing of resistance of splot welding.

X-ray methods are generally costly and time consuming and the equipment generally lacks adequate sensitivity since the amount of metal in the weld area is essentially the same as before the application of weld current.

Infra-red methods involve the introduction of heat to the metal joint and the measurement of heat distribution about the weld. Rapid dissipation through the joined plates or bodies yields poor resolution when attempting to accurately measure the weld or nugget size.

Resistance measuring systems involve the use of electrical circuits and apparatus for measuring the voltage and current at the welding electrodes during the welding operation. The change of resistance indicated by these measurements is an indication of the formation of the weld. These systems do not, however, provide information to show the quality of the cooled weld.

Ultrasonic methods and means as used heretofore provide for passing ultrasonic energy through the weld zone from one plate to the other and measuring the same as a function of the weld quality. Generally two electromechanical transducers are used, one as a transmitter on one plate and the other as a receiver on the other plate. Short-duration high-frequency mechanical transverse vibrations travel from the transmitter through the plates and interconnecting weld to the receiver. The amount of energy arriving at the receiver is related to the area of the joint. Hence, a measurement of sound at the receiver is useful in evaluating weld strength without resorting to destructive tests.

With prior ultrasonic methods and means, results generally have been inconsistent due to the inability to limit the propagation of sound to the weld zone because of critical transducer-weld alignment variables, particularly when testing at production line rates, and because of random scatter and absorption of ultrasonic energy as the sound makes many interwall reflections while traveling from the transister to the receiver transducer through the thin plates. Furthermore it is known that in connection with ultrasonic methods and means, electronic systems for displaying the resulting ultrasonic test data in an understandable manner have not been available.

Accordingly it is a primary object of this invention to provide an improved ultrasonic inspection system and apparatus for resistance or spot welds which gives consistent test results at production-line rates and a readable display of resulting ultrasonic test data.

It is also an object of this invention to provide an improved ultrasonic transducer and electronic display system for testing spot or resistance welds for quality and inspecting each weld continuously during the welding operation.

It is a still further object of this invention to provide an improved ultrasonic inspection system and apparatus wherein welding electrodal and ultrasonic transducer means are effectively a single instrumentality giving accurate control of ultrasonic energy and wherein detected ultrasonic signals can be calibrated to indicate initial electrodal pressure and condition of the weld during and after the welding operation.

For a proper resistance weld, (1) the electrodal or contact pressure must be such as to effectively reduce the surface resistance of the contacting metal surfaces to be welded in order that a high value of heating current can flow. (2) The current must be of the proper value to produce the heat to rapidly fuse the metal. (3) The time duration must be such that the current flows for a sufficient time to produce a weld or nugget of proper dimensions for a strong joint. To do the latter, the welds must have a proper depth and diameter and must not exceed a certain percentage of the total thickness of the two plates or bodies to be joined.

In accordance with the invention, a two-transducer through-transmission method of inspection is provided and wherein the welding electrode and ultrasonic transducer for both transmission and reception are single units. In other words, the transmitter transducer is in one electrode and the receiver transducer is in the other and opposite electrode, whereby the ultrasonic energy thus passes directly through the weld area by the shortest possible path. An improved structure permits this highly effective relation to be achieved.

When the welding electrodes are applied to the plates to be welded, sound energy sees a short, direct path through the weld members that terminates at the receiving transducer. The transmitter transducer receives a continuous series of short electrical impulses of high frequency and emits bursts of ultrasonic energy or mechanical vibrations which pass through the weld zone and are detected by the receiving transducer in the opposite electrode. The received vibrational or acoustical energy is converted to corresponding electrical energy which is amplified and detected for application to visual display or recording means, whereby the resulting test data is made available for reading or reference. Preferably this includes a cathode-ray tube and associated circuitry, the sweep time of the beam being adjusted to be substantially the same as the time for a welding operation for each spot or nugget. The vertical deflection is made responsive to the amplitude of the received signal pulses.

Assuming, as has been found to be the case, that the acoustical impedance of all of the materials, i.e., copper electrodes, metal interfaces, and aluminum plates, between the transducers remains substantially constant, the only variable is the weld spot or nugget as it is started, becomes molten, enlarges, and finally solidifies. Changes in the transmission of the applied ultrasonic signal have been found to be related to the nugget quality and growth, as the acoustical impedance of the weld zone varies or changes.

The transducers are of the piezoelectric type with flat quartz plates, the opposite faces of which are metal plated (chrome gold) and soldered or cemented to the electrodes. The ultrasonic operating frequency may be from 2 to 10 megacycles per second pulsed at a rate of from 60 to 2000 or more times per second. A test frequency of 5 mc. per second has been found to be effective. The frequency selected is a compromise to some extent between the extent of natural damping of the sonic energy that can be tolerated and attaining the desired sensitivity to detect the smallest size defect that is rejectable. As the test frequency is increased, the depth of penetration decreases due to increased damping, and the sensitivity to small defects increases.

The diameter or shape of each transducer is made larger than the anticipated optimum nugget or weld diameter or shape in order that the percent of maximum ultrasonic energy or signal interrupted during the welding process may be an accurate indication of the weld nugget or spot size.

The welding process of applying electrode pressure to reduce contact resistance at the weld interface provides a molecular bond between the involved interfaces which promotes effective ultrasonic energy transmission without need for fluid couplants.

It has been found that as the area of a molten nugget enlarges and approaches that of the ultrasonic transducers, the received ultrasonic signals decrease in amplitude. Then, as the electrodes indent and increase the area of contact and enlarge the size of the effective weld zone and transmission path with increased pressure, the received signals increase in amplitude until the molten weld nugget further enlarges and again decreases the signal amplitude at the receiving transducer. When calibrated, the signal amplitude indicated by the vertical deflection of the cathode-ray beam may be made to indicate the size of the weld and, from data gathered by shear tests of specimens, the strength of the weld with a high degree of accuracy.

Thus this improved system can be used to obtain accurate weld information, and in conjunction with data relating to the pressure-current-time essentials for a proper weld as discussed herein, a plot can be made of the time-rate-growth of a weld. This cannot be done with ultrasonic test equipment and methods heretofore known.

The invention will be further understood from the following description of certain embodiments thereof, when considered with reference to the accompanying drawings, and its scope is pointed out in the appended claims.

In the drawings:

FIG. 1 is a schematic circuit diagram of an ultrasonic inspection system and apparatus for resistance welds and the like in accordance with the invention.

FIG. 2 is an enlarged cross-sectional view, in elevation of the welding electrode and transducer portion of the system and apparatus of FIG. 1, showing the construction thereof in accordance with the invention.

FIG. 3 is a similar cross-sectional view, in elevation, of a modification of the welding electrode and transducer construction shown in FIG. 2, further in accordance with the invention, FIGS. 4, 5, 6 and 7 are graphs showing curves illustrating certain operational characteristics of the system and apparatus of FIG. 1 in accordance with the invention, FIG. 8 is an end view, in elevation, of a further modification of the electrode and transducer portion of the system and apparatus of FIG. 1, further in accordance with the invention.

FIG. 9 is a cross-sectional view of the electrode and transducer modification of FIG. 8 taken on the section line 9—9 thereof, and FIG. 10 is a fragmentary cross-sectional view based upon the construction as shown in FIG. 9 to illustrate a modification thereof in accordance with the invention.

Referring to the drawings wherein like reference numerals indicate like parts and elements throughout the various figures thereof, and referring more particularly to FIG. 1, a pair of ultrasonic electromechanical or electronic transducers or transducer devices 12 and 13 are mounted for coaxial face-to-face relation respectively in two coaxial copper or like welding electrodes 14 and 15 as indicated. The latter are applied under proper pressure in coaxial relation to the work between them which may be two flat plates 16 and 17 or like bodies to be joined by a weld spot or nugget 18 which forms in response to heavy current of proper magnitude applied for a proper time, as indicated hereinbefore, from a welding current source or welder 19 through a supply circuit provided by two connecting circuit leads or conductors 20.

A suitable source of ultrasonic signals, such as an ultrasonic signal generator or transmitter 22, adjusted for operating at a frequency of from 2 to 10 megacycles (per second) for example, is connected with the transducer 12, as the transmitting transducer, through a circuit connection indicated by the lead 23 and system ground, indicated at 24 in the present example, as the usual common circuit return element of any system of this type.

The signal generator 22 is normally cut off in operation and sends out short pulses or signal bursts indicated by the wave form 25. It operates to do this in response to triggering pulses, of the type indicated by the wave form 26. These are applied thereto from a low-frequency repetition-rate generator or pluse source 28 with which it is connected by a suitable connection lead 29 and system ground 24. The repetition rate for the pulses 25 as provided by the generator 28 may be generally in the range of 60 to 2000 cycles (per second). In the present example it may be assumed that the generator or transmitter 22 operates at 5 megacycles (per second) and that the pulse or repetition rate is set at 200 times per second which has been found to give consistent results.

The receiving transducer 13 in the electrode 15 is connected, through system ground and an output lead 30, with signal utilization means for deriving welder and weld quality data in understandable and readily useable form as before indicated. This comprises electrical signal amplifier and detector means which may be of any well known form, here indicated by the block 31. Received acoustical pulses are converted to electrical pulses 32 by the piezoelectric action of the transducer 13 and are applied, through a circuit including the lead 30, to the amplifier and detector means 31 to provide the control signal envelope 33 at an output circuit including the lead 34. The ultrasonic energy or signals from the transmitter element 12 pass axially directly through the electrodes 12 and 13, the plates 14 and 15, and the weld spot or nugget area 18 as indicated by the dotted arrowed lines 35.

The signal output pulses 33 are applied to the cathode-ray tube 37 of an oscilloscope 38 connected to the lead 34 and system ground 24 to cause a varying vertical deflection of the electron beam while the horizontal trace or deflection is made to occur in the time required normally to complete one weld cycle or from four to five seconds as presently provided with equipments of the type shown and described herein. The horizontal trace or deflection is initiated from the zero or fly-back position by closure of a control switch 39 connected with the oscilloscope through an external control circuit 40.

The switch is connected with the welder in any suitable way to be actuated at the initiation of each welding operation or cycle to start the horizontal sweep. In the present example the welding cycle is started by a push button or foot switch element 42 on the welder which is extended to operate the switch 39 through an extension rod or like element 43 in contact with a blade 44 of the switch to move it to the closed position and simultaneously could be operated by the electrode movement as pressure is applied to the work.

The oscilloscope is blanked or off normally so that the cathode beam does not appear to provide a trace with vertical deflection except when unblanking signals are applied thereto through system ground and an input control lead 45 as may be provided for unblanking or blanking control of such devices. In the present example the unblanking signals are square waves as indicated by the wave form 46. They occur at the repetition rate for the applied ultrasonic signal pulses 25 from the transmitter 22 and may thus be derived from the rate generator 28 through a second output circuit lead 48.

The lead 48 is connected with the circuit lead 45 through any suitable circuit means for squaring the peaked pulses 26 from the rate generator and delaying the delivery to the oscilloscope as will be described. Since the delay is only a few microseconds and circuits for delay and squaring are readily available and known, the squaring and delay means is indicated by the block 49 to further simplify the diagram and better show the overall system which embodies the inventive concept hereinbefore noted.

Referring now to the enlarged and detailed showing of the electrode and transducer units in FIG. 2 along with FIG. 1, the electrodes 14 and 15 are adapted to be mounted in welding apparatus having pressure-applying elements outlined at 51 and 52 into which they may be screw-threaded with a taper fit for good electrical contact as indicated. The electrodes are provided with axially-extending water-cooled orifices 53 with water inlet pipes 54 extending in short of the inner ends 55 thereof which provide flat seats, in planes normal to the axis, for the transducers 12 and 13.

The transducers are preferably of the flat piezoelectric wafer type indicated to seat with good contact against the inner flat ends of the central orifices as indicated and are soldered or cemented thereto. The conductors 23 and 30 are insulated and extend through the walls of the electrodes into the inner orifices through water-tight packing sleeves 56 where they are soldered to the inner face of each crystal. For good electrical contact and connections with the conductors on one face and with the electrodal surfaces on the other, each flat wafer surface preferably is plated with conducting material such as chrome-gold metal in a thin surface layer.

Such piezoelectric transducer devices are available on the commercial market and are preferably of the quartz X-cut type substantially greater than the diameter of he desired weld spots such as ½ inch, for example, and of a thickness to provide response to the ultrasonic test frequency, such as 5 megacycles (per second) for example.

It will be seen that this construction combines welding electrodes and ultrasonic transducers into single units aligned on a common longitudinal axis on each side of the weld area. This gives more accurate control of the ultrasonic energy which passes, as indicated by the lines 35, directly through the weld area by the shortest possible path from the transmitter transducer, or transmitter 12, to the receiving transducer or receiver 13.

Other ways for mounting the transducers for directing ultrasonic signal waves or energy along the electrodal axis can be provided in accordance with the invention. For example, as indicated in FIG. 3 to which attention is directed along with FIG. 2, in each of two welding electrodes 59 and 60, of different configuration from and corresponding to the electrodes 14 and 15 respectively, the inner end 61 of each central chamber or orifice 62 is machined to an optical flat with the plane thereof at an angle of 45 degrees to the common central axis of the electrodes as aligned for the welding operation. The transmitter transducer 12 is affixed to the outer wall of the electrode 59 to face inwardly toward and on a directional axis at a right angle to the axis of the electrode. The receiver transducer 13 is similarly affixed to the outer wall of the electrode 60. As in the present example, suitable bosses 63 with flat outer faces 64 may be provided and positioned on the electrodes for mounting each of the crystals or transducers in alignment with the axis of the electrode with which it is associated.

When the electrodes are aligned in operation, the 45-degree optical flats or reflecting surfaces 61 in the central chambers or orifices 62 are thus aligned on the common longitudinal axis and provide for reflection of the ultrasonic energy from the transmitter 12 to follow a path, as indicated by the arrowed line 65, through the weld zone 18 between the plates 16 and 17 to the receiving transducer 13 for the recovery of useful information concerning the weld and welder operation, which will now be considered further.

With X-cut piezoelectric crystals on the transducers, pulse type compressional ultrasonic vibrations or signal waves are transmitted by the transducer 12 and follow substantially a straight line path through the copper electrode, the first weld plate, the weld zone, the second weld plate and the other copper electrode to arrive at the receiving transducer or receiver 13 where the variably attenuated mechanical energy from the transmitter is converted by piezoelectric action into electrical energy in the form of a low-level voltage or signal of variable amplitude corresponding thereto.

The low-level signal voltage from the transducer 13 is translated through the amplifier and detector means 31 to produce the envelope 33 of the input wave 32 at a level for presentation on the recording or indicating means provided, such as the cathode-ray tube 37 of the oscilloscope 38. Thus the unit 31 may be provided with any suitable means for rectifying or demodulating the ultrasonic high frequency signals or signal pulses to provide the output signal envelope 33 of each pulse.

These envelopes are also pulses which are applied to the vertical deflection system of the oscilloscope 38 in which the amplifying and signal translating circuits should be adapted to respond to signals up to 10 megacycles (per second) at least.

The ultrasonic signal of specific interest is the first pulse or mechanical vibrational wave from a given transmitter pulse to arrive at the receiver after passing through the weld or weld area. All others are superfluous for deriving the desired information concerning the weld condition and are cut off to prevent the effect of random reflections of the transmitted signal. Accordingly the square-wave unblanking signals applied to the cathode-ray tube 37 through the signal circuit connection 45 are delayed in time to coincide with the arrival of the useful information, as derived from the ultrasonic signal flow through the weld zone.

Normally, the face of the cathode-ray tube is dark or blanked. The unblanking signal 46 is applied to the oscilloscope 38 and tube 37 in any well known manner, such as a negative bias on the cathode, for example, to momentarily permit the cathode ray beam to flow and the useful information, as indicated by its vertical deflection through one horizontal sweep, to be observed and/or photographed for a record. The graph in FIG. 4, bearing suitable legends for the several curves, shows the time relationship of all signals which are derived in the process of testing a weld operation for proper machine functioning and weld quality.

Referring to FIG. 4, the first curve A shows the time relation of the repetition-rate synchronous pulses 26 as they occur at the time interval T. The latter is one two-hundredth of a second where the rate is 200 pulses per second as suggested for the present example. These pulses as indicated by the second curve B result in causing vibrational pulses 25A from the transducer 12 to be transmitted with the same time interval through the weld zone 18 as a result of the applied electrical signal pulses 25 from the signal source 22 on the transducer 12. The timing cycles in the present example are based upon the zero or starting line 68 for the first pulse 26 and the second line 69 representing the end of the time interval T and the beginning of the second timing pulse 26.

The third curve C shows the delay time D for the passage of the ultrasonic vibrations or signals 25A through the weld zone before arriving at the receiving transducer 13 as signals 32A. This is dependent upon the kind of material and the delay time thus differs with different materials. This passage also subjects the signals to amplitude variation dependent upon the weld pressure and condition of the weld spot as it starts, grows and finally solidifies. The delayed vibrations are translated into the electrical signals or pulses 32 for utilization as noted hereinbefore to provide the vertical deflection of the cathode ray beam, or otherwise indicate the information desired with regard to the welding operation or cycle. The lines 70 and 71 indicate the end of the delay time and the beginning of the resultant application of the vibrational pulses to the receiving transducer.

The fourth curve E shows the signal pulses 33 that are applied at the cathode-ray tube from the detector and amplifier unit 31. As indicated by the curve F, the unblanking signals or negative voltage pulses 46A, corresponding to the signals from the delay and squaring circuits 49, are timed to occur during or to cover the above response peaks of curve E. This is shown in the curve G, the intervals between the resultant signal peaks 72 are blanked by this means and only the useful signal information is made visible. These peaks vary in amplitude and occur at the repetition rate of from 60 to 2000 times per second. In the present example 200 times per second was selected as being a normal value for welding aluminum plates.

A record of the variation of the pulse amplitude during a weld operation may be made by photographs in a continuous sequence. The curve H in FIG. 5 is representative of the overall trace of the cathode ray beam peaks on vertical deflection during the time of one weld operation which is also the time of one horizontal sweep of the cathode ray beam as made to cover this operation fully. As indicated, the overall trace contains or is made up of the successive timed ultrasonic data pulses 72 at the rate of 200 per second in the present example. To prevent complication a token showing of these appear in FIG. 5, to which attention is now directed.

The cathode ray tube is adjusted so that the beam spot is stationary at the left end or start of its trace, as at 75 or zero in the figure. The sweep length time is adjusted to coincide with the time required for completing a single weld operation, including applying the proper weld pressure on the electrodes and the plates to be joined.

With the plates to be joined inserted between the weld electrodes, the latter have welding pressure applied increasingly until a predetermined value is attained. An acoustical path of increasing conductivity is provided through the weld area as the contact area of the plates in the weld area and the electrodal contact area on the plates increases. The cathode ray tube is put into operation to respond to the signal transmission through the weld area as by operation of the control switch 39. This triggers the oscilloscope as the welder 19 is activated by the control element 42. In time sequence in the example shown, the welding current will flow after weld pressure buildup for a time interval indicated between the time limit lines 76 and 77 in FIG. 5. As the electrode pressure builds up the amplitude of the cathode ray vertical deflections or signal height of the successive pulses increase to provide the overall envelope or trace 78 in the weld pressure section of the curve H.

When the weld current begins to flow as at 76 the metal starts to go into fusion to form the weld spot or nugget and gradually reduces the sound transmission or the amplitude of the vertical deflections or pulses 72 as a molten pool forms and enlarges. This results in the falling curve section 79 whereby formation of the nugget is indicated.

As the electrodes then indent to a greater extent due to the heating, the electrodes then cover a circular ring area about the molten pool of the weld and the sound transmission increases in amplitude as indicated by the upgoing curve section 80 of the curve H. Due to continued heating the pool then grows to bring the nugget to full size and the transmission falls off again as indicated by the down-going curve section 82 from the peak 81 which gives this feature of the curve its height S as an indicator of the nugget size and quality.

At this point, as indicated by the line 77, the welding current is cut off and as the nugget cools the sound transmission through the weld area increases to provide the rising curve section 83. As the cooling continues and shrinkage of solidified metal causes deformation of the electrode-metal contact area, the sound transmission is reduced accordingly as indicated by the curve section 84. The sound or signal transmission falls to zero, as indicated by the curve section 85, when the electrodes are separated to fully break the conductive ultrasonic path.

The shape and height of the weld curve or center element 80–81–82 of the welding operational curve H is an indicator of the effectiveness and strength of the weld and can indicate weld strength and expected effectiveness under load. The height of the initial curve section 78 likewise can provide a measure of the electrode pressure which must be set before the weld current flows. This requires data to be derived by tests conducted with the equipment described and, among other things, has led to useful operational charts or graphic data indicated in FIGS. 6 and 7.

In FIG. 6 is shown the electrodal or weld pressure relations with the ultrasonic signal height as appears on the face of the cathode-ray indicator tube 37 in operation during or before a weld. Also the relation of the weld pressure to the electrode contact area is shown as such data is required for setting up continuous weld operations in production. Thus in FIG. 6 the curve 88 shows the electrodal contact area that can be derived with a given weld or electrodal pressure for a given set of electrodes and this can thus be set up by reference to the corresponding ultrasonic signal height observed on the cathode ray tube in scale divisions, for example, and given by the curve 89. Thus the system aids in setting up the operating conditions desired before the weld starts.

As the amount of interface area contact determines the extent or effectiveness of the acoustical path, a graphical relationship between pressure and ultrasonic signal height is formed. Measurement of the ultrasonic signal height just prior to the application of weld current thus will indicate the transient or gradual pressure changes from this static initial condition during the weld cycle as a measure of its effectiveness and quality according to a standard.

FIG. 7 is a graph showing by curves 90 and 91 respectively, the relation between ultrasonic signal height during the application of welding current and resulting nugget diameter measurements, and the expected tear or shear strength of the weld for that nugget diameter. This signal height can be that at S in FIG. 5. This characteristic rise in ultrasonic signal height during current flow or the welding period (between lines 76 and 77 of FIG. 5) occurs only when the weld is formed. By comparing the characteristic signal height S and the general physical configuration of the curve section 80–81–82 with predetermined control test data, an accurate prediction of nugget diameter and weld strength is obtained.

An important consideration in this development was the possibility of a loss in ultrasonic crystal sensitivity due to the flow of high fusion or welding currents in the order of 100,000 amperes for example. This was investigated with a special double ended copper electrode comprising two electrodes of the type shown in FIG. 2, for example, joined together end-to-end in one piece so that there was no physical break in the material between the ultrasonic transducers. After tests at weld currents from 10,000 to over 100,000 amperes with this test electrode structure there was no apparent loss in ultrasonic energy (signal amplitude loss or variation). It was thus shown that the flow of ultrasonic signal energy through the weld area is independent of the current flow and responsive only to the electrode or weld pressure and material change or weld condition.

Referring to FIGS. 8 and 9, the ultrasonic inspection system of the present invention is adapted for continuous spot or resistance welding, as in making a seam or joint along the edges of the plates 16 and 17. For this type of spot or resistance welding, the electrodes are of the rotary type, and may be in the form of wheels or rollers 93 and 94. These are mounted on suitable drive shafts, 95 and 96 respectively, for rotation in the directions indicated by the arrows to drive the plates between them for a progressive spot weld 97. The roller electrodes are recessed to provide in each an inner curved wall surface 98 which is circular, continuous, and concentric with the shaft axis.

On opposite sides of the active spot or weld area 97, the transmitter transducer 12 and the receiver transducer 13 may be mounted to face each other in fixed relation for the transmission of ultrasonic vibrations or signals 35 as in the preceding embodiment of FIGS. 1 and 2. A fixed contact shoe 100 is provided for each transducer in frictional or sliding contact with the electrode wall surface 98 of the associated electrode preferably using a fluid medium at the contact for sound coupling, and with the transducer mounted thereon for direct ultrasonic signal transmission therethrough. Signal connections, as by the leads 23 and 30 may be made to the transducers, as in the prior embodiment, through the open face of each recess in the electrodes as indicated.

As in the preceding modification of FIG. 3, the roller electrodes may be adapted, as shown in FIG. 10, for external mounting of the transducers by providing an inner continuous circular wall 102 at a 45° angle to the signal direction through the weld zone 47 and an outer flat contact surface 103 on the electrode 93 for applying the ultrasonic signals from the transducer 12 through a fixed contact shoe 104. The surface 102 is ground to provide means for reflecting the signals from the transducer 12 in the path 105 through the weld zone 97 and into the lower electrode 94 which is similarly arranged to reflect the signals from the path into the outer receiver transducer in a manner similar to that described with respect to FIG. 3. Hence further showing or description is believed to be unnecessary.

From the foregoing description it will be seen that the present weld inspection system is based upon the use of mechanical vibrations or ultrasonic signals rather than electrical voltage, current or resistance measurements, and is therefore independent of the welding operation. Adjacent welds have no effect upon the accuracy of indications and hence it is well adapted for seam spot welding. The detection means is limited to the welding electrodes for connection with a resistance welder or welding system. It can thus be applied to existing welding equipment of this type with a minimum of modification and cost.

The resulting data can be recorded as in the pictorial record shown in FIG. 5. This gives an inspection pattern or showing of the time sequence of welding process the welding pressure, welding time and quality, by the shape, height and duration of each section of the curve H. The growth and quality of the weld is indicated by the shape and length of the sections 79–83, particularly, which permit the proper weld pressure to be attained for good contact for current flow and ultrasonic signal conduction. When the weld current of proper value is applied the molten nugget is rapidly formed as indicated by the rapid fall of the curve section 79. The electrodal pressure and the current is proper if the curve section 80–81–82 rises and falls with a good base width as shown in FIG. 5, and the pressure is further checked by the rapid rise of the curve section 83. The current must flow for the proper time duration to produce a weld or nugget of the proper dimensions, as determined for the particular materials being joined, and a strong bond or joint when cooled. This time duration is marked for evaluation by the width of the curve between the limits 76 and 77 in FIG. 5 for example. Weld pressure, current and time duration of all steps are thus indicated by the data derived from the ultrasonic signal flow directly through the weld zone. In accordance with previously generated data, parameters for proper welds and desired weld quality may be set up for any weld operation by this system.

Consistent test results at production-line rates and a readable display of resulting ultrasonic test data are provided. The inspection of each weld for quality and strength is provided continuously during each welding operation.

The welding electrodes and ultrasonic transducers are effectively a single instrumentality for heating current and ultrasonic signal flow through the weld zone along the same axis which is generally that of the electrodes. Thus the transducers are always properly aligned for signal transmission and reception when the electrodes are aligned for making a weld and engage the work on opposite sides under pressure. The single instrumentality, as above, gives accurate control of the ultrasonic energy, and the derived and detected ultrasonic signals provide accurate data showing the operating conditions and weld characteristics for each weld. This data relates to the weld pressure and the growth and quality of the weld nugget or spot.

We claim:

1. In a spot welding system, the combination with a pair of hollow welding electrodes mounted in opposed relation and alignment for engaging and passing electrical heating current in a zone through welding work interposed between them, of a pair of ultrasonic electromechanical transducers carried by said electrodes, means for transmitting spaced bursts of ultrasonic signals from one transducer to the other as a receiving transducer through said zone and the electrodes, thereby to subject said signals to attenuation and variation in amplitude in response to variations in the ultrasonic signal conductivity and condition of the weld formation in said zone, means connected with said receiving transducer for rectifying received signals to provide an overall signal envelope and an indication of said attenuation and amplitude variation as a measure of the weld quality, and means including an oscilloscope connected with said rectifying means to indicate the shape of said envelope and triggered into operation in response to the application of current to said electrodes.

2. In a spot welding system, the combination as defined in claim 1, wherein the welding electrodes are coaxial and provided with axially-extending internal coolant orifices with flat inner end walls in planes at a right angle to the common electrodal axis, and wherein the transducers are of the flat-disk piezoelectric type seated on said end walls within the respective electrodes, whereby said transducers are aligned in face-to-face relation on the common electrodal axis for direct signal transmission and reception through the weld zone.

3. In a spot welding system, the combination as defined in claim 1, wherein the welding electrodes are coaxial and provided with axially-extending internal coolant orifices with inner optically-flat signal-reflecting end walls at a 45° angle to the common electrodal axis, and wherein the transducers are positioned externally of the electrodes to lie in the reflection path of said ultrasonic signals from said end walls to and from said axis.

4. In a spot welding system, the combination as defined in claim 1, wherein the welding electrodes are of the rotary type adapted to have the work pass between them and provide in each an inner curved wall surface concentric with the electrode axis, and wherein the transducers are fixed with respect to said walls to permit rotation of the electrodes between them during ultrasonic acoustic signal transmission between them.

5. In a spot welding system, the combination with a pair of hollow welding electrodes mounted in opposed coaxial relation for engaging and passing welding current in a zone through welding work interposed between them, of a pair of ultrasonic piezoelectric high-frequency transducers carried one within the hollow interior of each of said electrodes in unitary relation therewith, means for transmitting spaced short bursts of ultrasonic vibrational signals in the low megacycle frequency range from one transducer to the other as a receiving transducer axially through said zone and the electrodes, thereby to subject said signals to attenuation and amplitude variation in response to variations in the ultrasonic signal conductivity and condition of a weld formation in said zone, said last-named means including a pulsed signal generator connected with the one transducer for applying electrical signals thereto in single spaced pulses in said frequency range at a fixed repetition rate to produce said ultrasonic signal bursts, means connected with the other transducer for amplifying and rectifying corresponding resultant electrical ultrasonic signal pulses translated thereby from received vibrational signals to provide a variable-amplitude output signal envelope from said pulses through each weld cycle, means including a cathode-ray tube oscilloscope connected with said amplifying and rectifying means and responsive in vertical deflection to said control pulses for indicating the overall envelope of the amplitude variations thereof with respect to a time base, means for blanking said cathode-ray tube between received pulses, and means for starting the horizontal beam deflection of said tube at the start of each weld cycle and continuing said deflection through said cycle.

6. The combination with a spot welder having two welding electrodes in opposed relation on a common longitudinal axis for applying welding current to work in a zone therebetween along said axis to form a weld, of a first piezoelectric ultrasonic transducer on one electrode and a second piezoelectric ultrasonic transducer on the other electrode coupled for ultrasonic signal transmission from the first to the second transducer along said axis in a direct path through said weld zone, pulse-controlled high-frequency signal generator means connected with the first transducer to apply spaced high-frequency signal pulses thereto for generating corresponding high-frequency vibrational signal pulses for transmission and application to said second transducer along said path and through said weld zone subject to the variable acoustic impedance and amplitude variation thereof, means connected with the second transducer for amplifying and rectifying the resultant variable-amplitude high-frequency signal pulse output therefrom, visual indicating means including a cathode-ray tube connected with said amplifying and rectifying means for variable-amplitude vertical beam deflection in response to said rectified signal pulse output, said tube being normally blanked off and having a horizontal beam sweep timed to extend through one weld cycle for each operation, control circuits connected with said tube to provide delayed unblanking thereof at the repetition rate of the signal pulses applied to the first transducer, operating means for initiating each weld cycle and applying heating current to said electrodes, control means responsive to the initiation of each weld cycle for starting the horizontal sweep of the cathode-ray tube and developing from the beam trace the overall pulse signal envelope as a progressive visual graph of the weld cycle and an indication of weld pressure and quality through the initial molten and final solid state of the weld spot.

References Cited

UNITED STATES PATENTS

| | | | |
|---|---|---|---|
| 2,433,963 | 1/1948 | Tarbox | 219—109 |
| 2,700,894 | 2/1955 | Valkenburg | 73—67.6 |
| 2,728,405 | 2/1955 | Brant | 73—67.5 |
| 2,830,201 | 4/1958 | Wilson | 73—67.5 |
| 2,957,340 | 10/1960 | Rocha | 73—67.5 |
| 3,146,350 | 8/1964 | Topfer | 76—67 |

RICHARD M. WOOD, *Primary Examiner.*

P. W. MAY, *Assistant Examiner.*